Feb. 23, 1932. H. L. SCHERMERHORN 1,846,907
DYNAMO ELECTRIC MACHINE
Filed Jan. 23, 1930
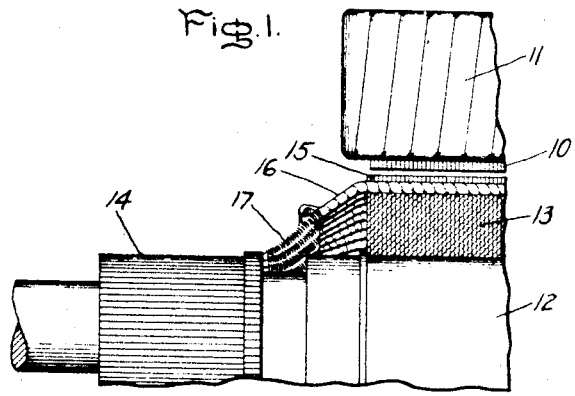
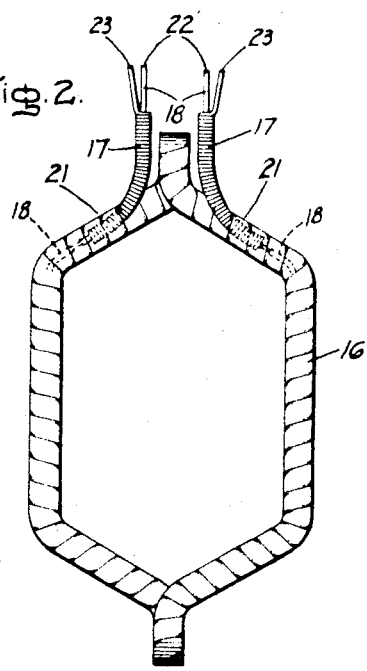
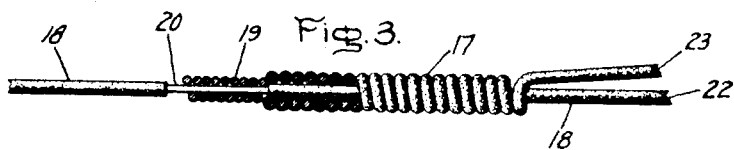
Inventor:
Harmon L. Schermerhorn,
by Charles E. Tullar
His Attorney.

Patented Feb. 23, 1932

1,846,907

UNITED STATES PATENT OFFICE

HARMON L. SCHERMERHORN, OF SCOTIA, NEW YORK, ASSIGNOR TO GENERAL ELECTRIC COMPANY, A CORPORATION OF NEW YORK

DYNAMO ELECTRIC MACHINE

Application filed January 23, 1930. Serial No. 422,908.

My invention relates to dynamo-electric machines.

In high voltage dynamo-electric machines of small size as heretofore constructed, the windings have been made of coils consisting of a large number of turns of fine wire and the ends of the coils serve as leads connecting the coils to the current collecting device. The coils are arranged on the rotatable member of the machine and extend and contract longitudinally thereof upon changes in temperature. This extension and contraction of the coils causes repeated bending of the leads which is localized at some point therein and causes them to break so that the winding must be repaired.

The object of my invention is to provide a dynamo-electric machine of such construction as to prevent localized bending of the leads of the winding thereof. I accomplish this by connecting the winding on the rotatable member of the machine to the current collecting device thereof by an arrangement including a helical member which prevents localized bending.

My invention will be more fully set forth in the following description referring to the accompanying drawings, and the features of novelty which characterize my invention will be pointed out with particularity in the claims annexed to and forming a part of this specification.

In the drawings Fig. 1 is a fragmentary view, partly in section, of a dynamo-electric machine embodying my invention; Fig. 2 is a plan view of a winding coil of the machine shown in Fig. 1 having leads made in accordance with my invention; Fig. 3 is a side elevation partly in section of the lead used on the coils shown in Figs. 1 and 2, and Fig. 4 is a modification of the lead shown in Fig. 3.

Referring to the drawings, for convenience of illustration, I have shown my invention in connection with a commutator type of dynamo-electric machine having a stationary member 10, a field exciting winding 11, and a rotatable member 12 including a core structure 13 and a current collecting device 14 which in this instance is a commutator. A winding is arranged in slots 15 in the core structure 13 in the usual manner and consists of a plurality of multi-turn coils 16.

In a dynamo-electric machine of this type the coils 16 extend and contract upon change in temperature of the rotatable member and the coils, so that the distance from the end of the commutator 14 adjacent the core structure and the end-turns of the coils varies. This causes repeated bending of the leads connecting the coils to the commutator which in prior constructions causes localized bending of the leads. This repeated bending of the leads frequently causes them to break and requires that the leads be repaired. It is also apparent that this localized bending may be caused in other ways, such as by vibration of the end-turns of the winding adjacent the commutator during operation of the machine.

In accordance with my invention, therefore, I provide an arrangement for preventing localized bending of the leads which includes helical members connecting the coils to the commutator. It will be understood that the leads and helices may be insulated or not as desired. In the particular construction illustrated in Figs. 1 to 3, which is an example of one manner of carrying out my invention, I arrange closely wound helices of insulated wire 17 on the insulated leads 18 of the coils 16. The end of the helices 17 adjacent the coil is bared as indicated at 19, and twisted about a bare portion 20 of the leads so as to form an electrical connection and thereby provide two conductors connecting each side of the coil to the commutator. A portion of the insulated helices are then bound in the insulating tape of the coils 16, as indicated at 21. The ends 22 of the leads 18 and the ends 23 of the helices are electrically connected to the same commutator segment, it being understood that the separate leads of the coil are connected to the commutator segments in the usual manner. By this arrangement, if there is extension or contraction of the coil 16 in the machine in which it is used, or if there is any tendency for the lead to bend, the helices 17 will prevent localized bending of the leads and thereby avoid their being broken. Moreover, if the leads are broken the helices serve to maintain the circuit between the coils and the commutator.

I have also found that this result may be attained by making the insulated leads of the coil itself of closely wound helices, as shown at 24 in Fig. 4, the ends thereof being bound in the coil insulation and connected to the commutator, as in the construction shown in Figs. 1 to 3.

Although I have shown my invention in connection with a commutator type dynamo-electric machine, I do not desire my invention to be limited thereto, and I intend in the appended claims to cover all modifications which do not depart from the spirit and scope of my invention.

What I claim is new and desire to secure by Letters Patent of the United States, is,—

1. A dynamo-electric machine having a rotatable member provided with a current collecting device, a winding on said rotatable member, a lead connecting said winding to said current collecting device, and a helical member on said lead having the ends thereof secured to said winding and said current collecting device respectively to prevent localized bending of said lead.

2. A dynamo-electric machine having a rotatable member provided with a current collecting device, a winding on said rotatable member, and a plurality of conductors for connecting said winding to said current collecting device, one of said conductors being wound about the other to prevent localized bending thereof.

3. A dynamo-electric machine having a rotatable member provided with a current collecting device, a winding on said rotatable member, a lead connecting said winding to said current collecting device, and a closely wound helix arranged on said lead and secured in the winding insulation, one end of said helix being connected to said winding and the end thereof being connected to said current collecting device.

In witness whereof, I have hereunto set my hand this 22nd day of January, 1930.

HARMON L. SCHERMERHORN.